(12) United States Patent
Pylappan (10) Patent No.: US 11,718,269 B2
(45) Date of Patent: Aug. 8, 2023

(54) SYSTEM AND METHOD FOR DEVICE TRACKING AND CONTACTLESS ORDER DELIVERY AND PICK UP

(71) Applicant: RAKUTEN GROUP, INC., Tokyo (JP)

(72) Inventor: Seejo Pylappan, Cupertino, CA (US)

(73) Assignee: RAKUTEN GROUP, INC, Tokyo (JP)

( * ) Notice: Subject to any disclaimer, the term of this patent is extended or adjusted under 35 U.S.C. 154(b) by 0 days.

(21) Appl. No.: 17/497,122

(22) Filed: Oct. 8, 2021

(65) Prior Publication Data

US 2022/0161756 A1 May 26, 2022

Related U.S. Application Data

(60) Provisional application No. 63/116,975, filed on Nov. 23, 2020.

(51) Int. Cl.
| | | |
|---|---|---|
| *B60R 25/24* | (2013.01) | |
| *B60R 25/33* | (2013.01) | |
| *G06F 21/36* | (2013.01) | |
| *G07C 9/22* | (2020.01) | |
| *G07C 9/00* | (2020.01) | |
| *G07C 9/27* | (2020.01) | |

(52) U.S. Cl.
CPC .............. *B60R 25/24* (2013.01); *B60R 25/33* (2013.01); *G06F 21/36* (2013.01); *G07C 9/00309* (2013.01); *G07C 9/00896* (2013.01); *G07C 9/22* (2020.01); *G07C 9/27* (2020.01); *G07C 2009/0092* (2013.01); *G07C 2209/08* (2013.01); *G07C 2209/63* (2013.01)

(58) Field of Classification Search
CPC ..... B60R 25/24; B60R 25/33; G07C 9/00309; G07C 9/00896; G07C 9/22; G07C 9/27
See application file for complete search history.

(56) References Cited

U.S. PATENT DOCUMENTS

| | | | |
|---|---|---|---|
| 2016/0098871 A1* | 4/2016 | Oz ..................... | G07C 9/00571 |
| | | | 340/5.61 |
| 2016/0155088 A1* | 6/2016 | Pylappan ........... | G06Q 10/0836 |
| | | | 705/333 |
| 2018/0260882 A1* | 9/2018 | Friedman ............... | G06Q 20/36 |
| 2019/0180546 A1 | 6/2019 | Tsujimura et al. | |
| 2019/0244460 A1* | 8/2019 | Kaneko .............. | G06Q 10/0833 |
| 2020/0250161 A1* | 8/2020 | Jain ......................... | G06Q 30/02 |
| 2021/0398070 A1* | 12/2021 | Rockman ........... | G06Q 10/0838 |

* cited by examiner

*Primary Examiner* — Nabil H Syed (74) *Attorney, Agent, or Firm* — Polsinelli PC (57) ABSTRACT

The present technology discloses methods, non-transitory computer-readable media, and systems for generating, for a transaction, a transaction code, wherein the transaction code includes a temporary key allowing access to a vehicle at a delivery location; sending, to a merchant device, the transaction code; sending, to the merchant device, an alert that the vehicle has arrived at the delivery location, wherein the temporary key is used to access the vehicle for placing a product inside the vehicle; receiving a notification that the product has been placed inside the vehicle; and disabling the temporary key.

18 Claims, 8 Drawing Sheets

Receive, from a server, a transaction code including a temporary key allowing access to a vehicle at a delivery location
260

↓

Receive, from the server, an alert that the vehicle has arrived at the delivery location
270

↓

Access, using the temporary key, the vehicle
280

↓

Send, to the server, a notification that the product has been placed inside the vehicle
290

SYSTEM AND METHOD FOR DEVICE TRACKING AND CONTACTLESS ORDER DELIVERY AND PICK UP

CROSS REFERENCE TO RELATED APPLICATIONS

This application claims priority to U.S. Provisional Application 63/116,975 filed on Nov. 23, 2020, the entire content of each of which is incorporated herein by reference.

TECHNICAL FIELD

The subject matter of this disclosure relates in general to the field of device tracking technologies, and more specifically pertains to methods, non-transitory computer-readable media, and systems that allow temporary access to a tracked device at a point of interest.

BACKGROUND

To facilitate product purchases, various technological tools have emerged that aim to simply various aspects of product advertising, ordering, purchase and/or delivery. Within this product purchase cycle, technological tools directed to product pickup and/or delivery have been developed.

SUMMARY

Example embodiments are directed to improving existing systems that provide arrival alerts. More specifically, example embodiments described herein improve the safety and security of such systems by including a temporary access key in a transaction code generated for the purchased product at a time of ordering the product and used for providing the arrival alerts to a merchant and/or a user. Upon the system notifying a merchant that a customer has arrived for picking up the purchased product, the temporary access key embedded within the code can be used to access the customer's vehicle for placing the purchased product inside the vehicle without the customer and merchant having to come into contact to exchange the purchased product.

In one aspect, a method includes generating, for a transaction, a transaction code, wherein the transaction code includes a temporary key allowing access to a vehicle at a delivery location; sending, to a merchant device, the transaction code; sending, to the merchant device, an alert that the vehicle has arrived at the delivery location, wherein the temporary key is used to access the vehicle for placing a product inside the vehicle; receiving a notification that the product has been placed inside the vehicle; and disabling the temporary key.

In another aspect, the method includes receiving the temporary key from at least one of the vehicle or a mobile device of a user associated with the vehicle.

In another aspect of the method, the temporary key is received at a time of receiving an indication of the transaction.

In another aspect of the method, the temporary key is received when the vehicle is within a threshold distance of the delivery location.

In another aspect of the method, the transaction code is one of a Quick Response (QR) code and a barcode.

In another aspect, the method includes, upon the generation of the transaction code, tracking movement of the vehicle; and sending updates to the merchant device regarding an estimated arrival time of the vehicle to the delivery location, a last one of the updates being the alert that the vehicle has arrived at the delivery location.

In another aspect of the method, the transaction code includes a transaction identifier, a user identifier corresponding to the user, a merchant identifier corresponding to the merchant, and a product identifier corresponding to the product.

In one aspect, one or more non-transitory computer-readable storage media includes computer-readable instructions stored thereon which, when executed by one or more processors, cause the one or more processors to generate, for a transaction, a transaction code, wherein the transaction code includes a temporary key allowing access to a vehicle at a delivery location; send, to a merchant device, the transaction code; send, to the merchant device, an alert that the vehicle has arrived at the delivery location, wherein the temporary key is used to access the vehicle for placing a product inside the vehicle; receive a notification that the product has been placed inside the vehicle; and disable the temporary key.

In one aspect, a device includes one or more memories including computer-readable instructions stored therein and one or more processors configured to execute the computer-readable instructions to generate, for a transaction, a transaction code, wherein the transaction code includes a temporary key allowing access to a vehicle at a delivery location; send, to a merchant device, the transaction code; send, to the merchant device, an alert that the vehicle has arrived at the delivery location, wherein the temporary key is used to access the vehicle for placing a product inside the vehicle; receive a notification that the product has been placed inside the vehicle; and disable the temporary key.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some examples and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

As noted above, with a product purchase cycle, tools directed to product pickup and/or delivery can provide updates to intended recipient(s) regarding the delivery and/or pick up of purchased product(s). One such notification can be arrival alerts provided based on receiving location updates from a moving target (e.g., a vehicle) in order to determine, as accurately as possible, the timing for alerting the destination (e.g., a store) about the arrival of the moving target at the destination. For example, when a user is driving to a location of a store to pick up an ordered item, the system's objective is to provide an accurate advance alert (arrival alert) to the operator of the store so that the operator can ensure the user's order is ready for pick when the user arrives.

Disclosed herein are systems, non-transitory computer-readable media, and methods for including a temporary access key in a code generated at a time of ordering a product. The code is then used for fulfilling an order for the product on the merchant end and is also used by a product pickup/delivery system for tracking device movements associated with customer(s) and merchant(s) that are parties to the product purchase, for purposes of providing arrival alerts to merchant (and/or the customer) at a point of product delivery/transfer (e.g., at a location of a merchant, at a location of the customer, etc.). The code and the temporary access key embedded therein may then be used to access a transfer medium for placing the purchased product therein upon arrival of the customer at the transfer location (or alternatively arrival of the merchant at the transfer location). The temporary access to the transfer medium eliminates the need for in-person contact between customers and merchants and thus improves the safety and security of such product pickup/deliver systems.

For example, a customer picking up a product from a brick-and-mortar store traditionally needs to park their car, walk in, pick up a product (ordered online or in-person), and walk out or have a merchant representative bring the product to the customer. The present technology makes this process more efficient and easier for the customer by providing the merchant temporary access to the customer's vehicle via a code generated for the purchased product. When the customer arrives at the location for picking up the product, the merchant can walk out, unlock the car using the code, and put the product in the trunk without the customer having to park or leave the car and/or come into contact with the merchant for the delivery of the product.

The disclosure will proceed with a description of example systems for implementing a contactless delivery process using a temporary access key embedded within a code for a purchased product.

Figure 1A:
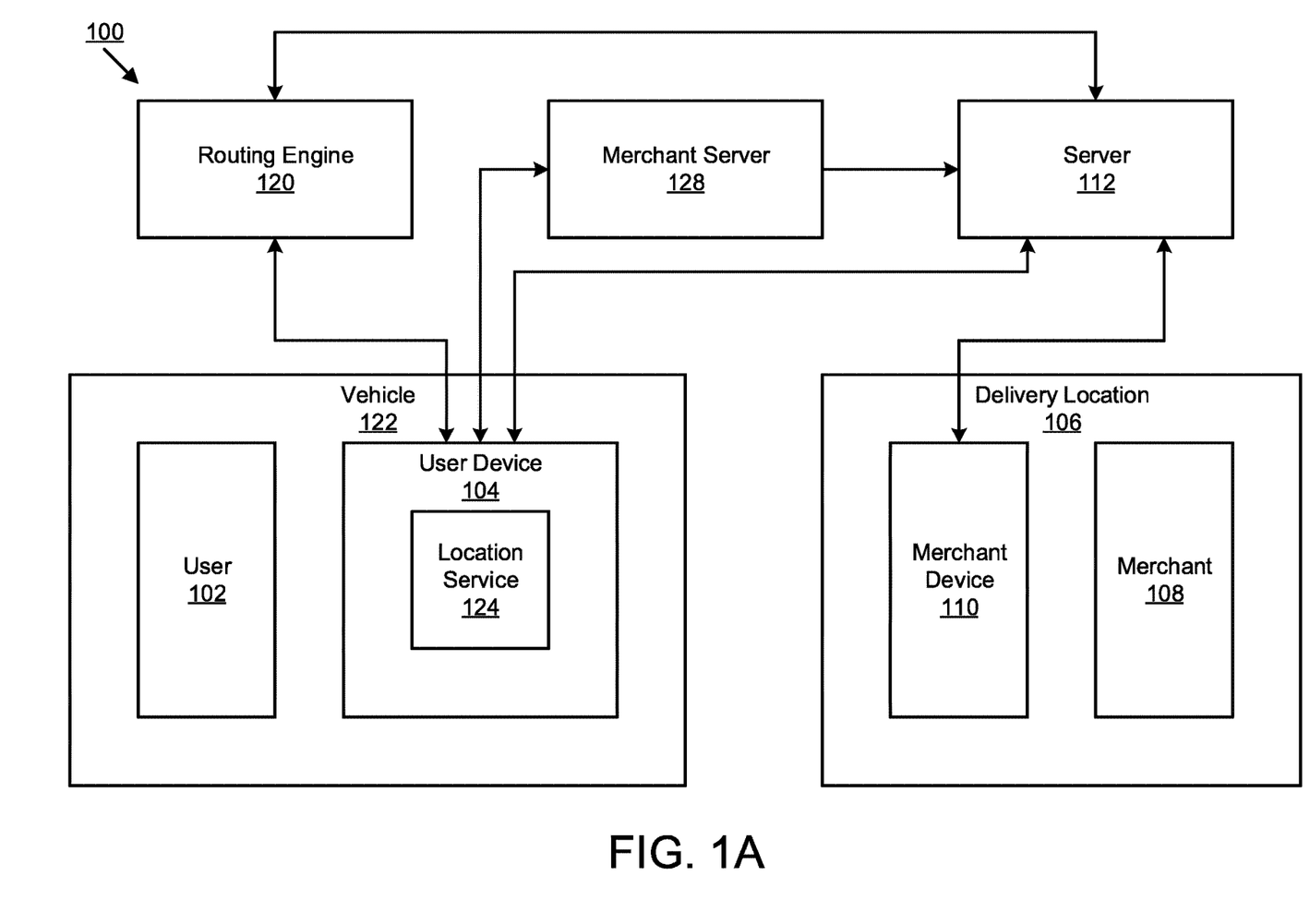
FIGS. 1A and 1B illustrate example systems in accordance with some aspects of the present disclosure.
Figure 1B:
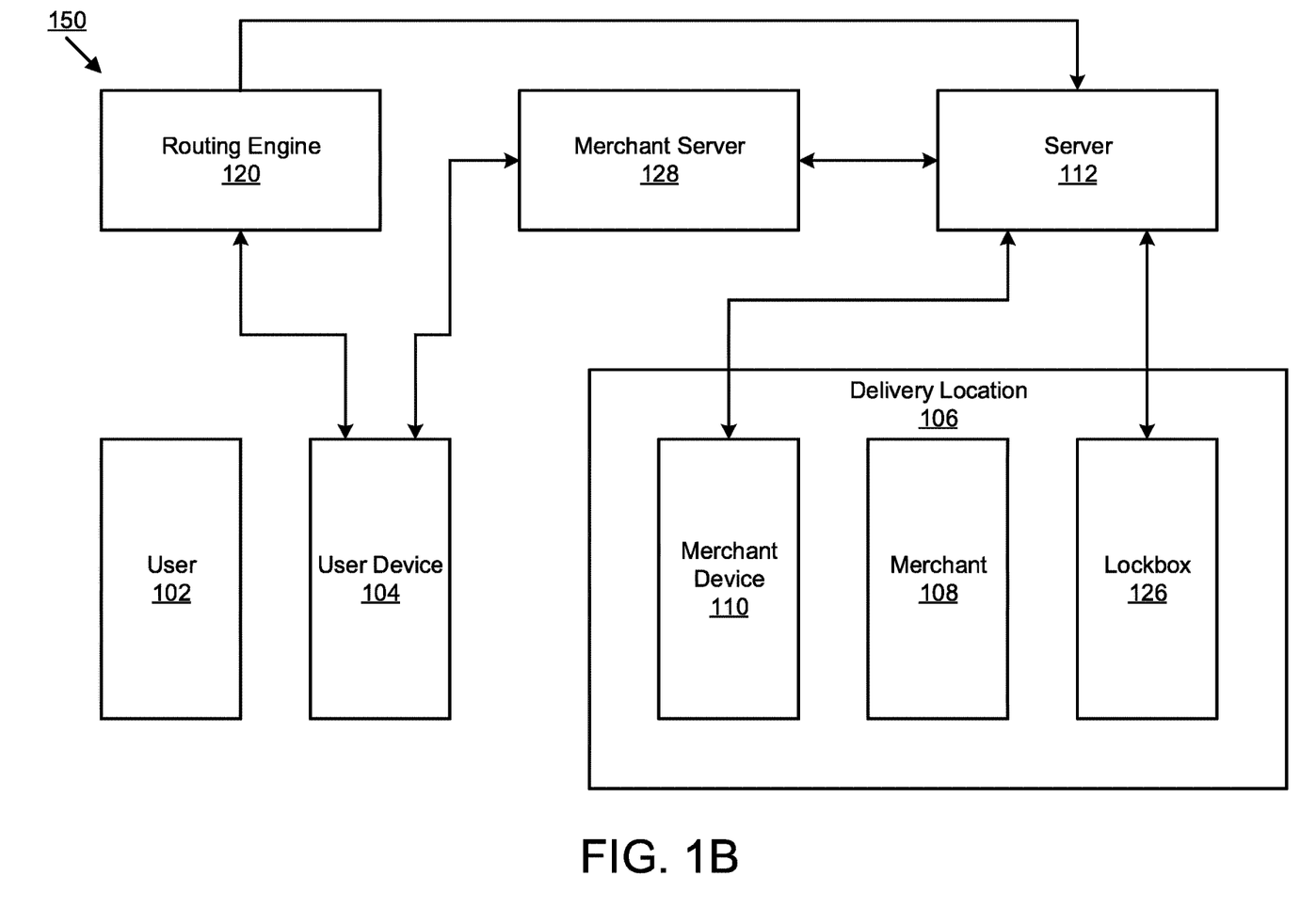

FIGS. 1A and 1B illustrate example systems in accordance with some aspects of the present disclosure. System 100 of FIG. 1A illustrates various components functioning in communication with one another to allow an order to be placed for a product or a service, a transaction code be generated for the order, movement of a vehicle for picking up the product (or receive a receive) be tracked, arrival alerts be provided to the merchant at the point of delivery including temporary access to the vehicle for placing the ordered product therein. Components of system 100 will now be described.

In FIG. 1A, user 102 can be a customer purchasing a product using user device 104. In some examples, user device 104 can be a personal mobile device, a smart watch, a personal digital assistant, a laptop, a tablet, or a user device embedded within vehicle 122. In some examples, vehicle 122 can be a car, a bus, a bike, a public transportation vehicle, or other transportation mechanism utilized by user 102 for traveling to a destination (a product pickup/delivery location which may also be referred to as a transfer point). Location service 124 on user device 104 is capable of tracking the movement of user device 104 and/or vehicle 122. Location service 124 can communicate with routing engine 120 and/or server 112 over a network, such as any known or to be developed wired and/or wireless communication scheme such as a cellular network, a Wi-Fi connection, etc. In some examples, location service 124 can be a global positioning system embedded within user device 104 capable of receiving and/or recording geographical coordinates of user device 104.

User 102 can order a product from merchant 108 by sending an order request to merchant server 128 via user device 104. The order can be made via a website or a mobile application whereby user 102 access a website of merchant 108 (or uses a mobile application of merchant 108 installed on user device 104) to place an order for the product. In another example, user 102 may place the order in person at a merchant location or may place the order at one location of merchant 108 to be picked up at another location of merchant 108. The order can be picked up at delivery location 106.

Merchant server 128 can be a cloud accessible server for processing and managing orders placed with merchant 108. Merchant server 128 may be in communication, using any known or to be developed wired and/or wireless communication scheme, with merchant device 110, server 112, etc.

Server 112 may be a backend server associated with order tracking and delivery system of the present application. Server 112 may be in communication with merchant server 128 and upon placement of an order for a product or service via a user device 104, may receive an indication from merchant server 128 of the ordered product/service. In response to receiving the indication, server 112 can generate a transaction code for the order, such as a QR code, barcode, or any other known or to be developed computer-readable tag or identifier. The transaction code can contain information such as a transaction identifier, a user identifier corresponding to user 102, a merchant identifier corresponding to merchant 108, and a product identifier corresponding to the product or products. In addition, the transaction code can include a temporary key granting access to vehicle 122. This temporary key can be received from user device 104, directly from vehicle 122, or from another server associated with vehicle 122 or user device 104, as will be further described below. In some examples, the temporary key can be received and embedded within the transaction code while user 102 is driving toward delivery location 106 in vehicle 122 (e.g., when user device 104 and/or vehicle 122 arrive within a threshold proximity of delivery location 106, with such threshold proximity being a configurable parameter determined based on experiments and/or empirical studies).

Server 112 can send this transaction code to merchant 108 via merchant device 110 to facilitate tracking user device 104/vehicle 122 for purposes of fulfilling the order. Server 112 can also use location data associated with the movement of vehicle 122 and/or user device 104 to send an arrival alert to merchant device 110 to inform merchant 108 of estimated arrival time of vehicle 122 and/or user device 104 in order for merchant 108 to ensure that the ordered product/service is ready to be delivered to user 102 upon arrival of user 102 at delivery location 106.

Delivery location 106 can be a target location where the product transfer from merchant 108 to user 102 (or to vehicle 122) will occur. Merchant 108 can receive arrival alerts from server 112 via merchant device 110 regarding the arrival of user 102. Server 112 may provide continuous and/or periodic alerts or updates regarding estimated time of arrival of vehicle 122 and/or user device 104 at deliver location 106 based at least in part on routing and traffic information received via routing engine 120. Routing engine 120 can receive location data from location service 124 via user device 104 or vehicle 122 and perform tasks associated with mapping applications. It may take into account distance to delivery location 106, speed limits, traffic, weather, and time of day conditions in providing arrival time information to server 112. Server 112 can use this information to refine, revise, and provide additional alerts to merchant 108 as needed. Routing engine 120 functionalities can be implemented by server 112 or it may have its own dedicated server and memory as well as a database of maps, traffic data, etc. Generation and communication of arrival alerts to merchant device 110 can be based on any known or to be developed method, non-limiting examples of which are described in U.S. application Ser. No. 15/672,399 filed on Aug. 9, 2017; U.S. application Ser. No. 16/402,368 having the effective filing date of May 3, 2018; U.S. application Ser. No. 16/167,658 having the effective filing date of May 3, 2018; U.S. application Ser. No. 16/402,408 having the effective filing date of May 3, 2018; U.S. application Ser. No. 16/402,432 having the effective filing date of May 3, 2018; and U.S. application Ser. No. 16/162,902 having the effective filing date of May 3, 2018, the entire contents of which are incorporated herein by reference.

Merchant device 110 can communicate with server 112 over a network, such as a cellular network or a Wi-Fi connection. In some examples, merchant device 110 can be a tablet, personal computer, mobile device, or a point of sale device.

In one example, delivery location 106 can be a brick-and-mortar store from which user 102 has ordered a product (or products) for purchase. User 102 can drive vehicle 122 to delivery location 106, and upon arrival, merchant 108 can be alerted to the arrival of user 102 for picking up the ordered product. To prepare merchant 108 for a speedy product transfer, location data of user device 104 and/or vehicle 122 can be accessed directly by merchant 108 on demand, or alternatively server 112 can generate arrival alerts and transmit the same to merchant device 110 as described above. In some examples, delivery location 106 can be a restaurant, a department store, or service providers such as dry cleaners or libraries and/or any other location at which a product or service purchased by user 102 can be transferred to user 102 from merchant 108 or a corresponding delivery service.

Server 112 can have one or more processors capable of implementing one or more sets of computer-readable instructions stored in one or more memories. Execution of such sets of computer-readable instructions can implement functionalities of methods described below with reference to FIGS. 2A, 2B, 3A, and 3B. Data stored in server 112 can be used to train machine learning algorithms implemented by server 112. These algorithms can help build destination-specific models and perform arrival prediction services be based on any known or to be developed method, non-limiting examples of which are described in U.S. application Ser. No. 15/672,399 filed on Aug. 9, 2017; U.S. application Ser. No. 16/402,368 having the effective filing date of May 3, 2018; U.S. application Ser. No. 16/167,658 having the effective filing date of May 3, 2018; U.S. application Ser. No. 16/402,408 having the effective filing date of May 3, 2018; U.S. application Ser. No. 16/402,432 having the effective filing date of May 3, 2018; and U.S. application Ser. No. 16/162,902 having the effective filing date of May 3, 2018, the entire contents of which are incorporated herein by reference.

Once vehicle 122 arrives (or is about to arrive) at delivery location 106, merchant 108 can receive an alert from server 112 via merchant device 110 that vehicle 122 has arrived or is about to arrive for product pickup. In some examples and upon arrival of vehicle 122 at delivery location 106, merchant 108 can open vehicle 122 using the temporary access key included in the transaction code. Using merchant device 110 and/or any other handheld/portable electronic device capable of receiving the transaction code, merchant 108 can use the temporary access key embedded in the transaction code to open vehicle 122. Using the temporary access key and merchant device 110 for accessing vehicle 122 can be based on any known or to be developed near field communication technology including, but not limited to, near-field communication (NFC), Bluetooth and Bluetooth Low Energy (BLE), ultra-wideband (UWB), radio-frequency identification (RFID), Wi-Fi network, or cellular network technologies, merchant 108 can use the temporary access key to open vehicle 122. Once the product transfer has been made, merchant 108 can notify server 112 that the transfer has taken place, at which point server 112 can disable the temporary key. In some examples, server 112 can generate a wait time which measures the lag between when vehicle 122 arrived at delivery location 106 and when it received a notification that the transfer has taken place. Wait time data can be used to improve estimated times of arrival or other aspects of the transfer.

In some examples, the transaction code can be shared with user 102 as well. In some examples, such as when the transaction code is a QR code, the QR code can be placed on the product package and user 102 can scan the code to ensure that receipt of the delivery has occurred.

FIG. 1B illustrates system 150, which is similar to system 100 illustrated in FIG. 1A and described above except that system 150 is directed to an example where the product transfer is made via a lockbox 126 at a delivery location 106 with user 102 accessing lockbox 126 for retrieving the ordered product instead of merchant 108 using the temporary access key to deliver the product to vehicle 122. Elements in FIG. 1B with same reference numeral as their counterpart in FIG. 1A will not be described for sake of brevity as their functionalities/operations are the same as those described above with reference to FIG. 1A. For example, user device 104 is FIG. 1B is the same as user device 104 in FIG. 1A and thus will not be described again with reference to FIG. 1B.

In the setting of FIG. 1B, user 102 can receive the transaction code with the temporary access key from server 112 upon placing an order for a product. Using user device 104 and the transaction code with the embedded access key, user 102 can access lockbox 126 and retrieve the product after it has been placed there by merchant 108. Merchant device 110 can receive location data from server 112 (receive arrival alerts in a similar manner as described above) to make sure that merchant 108 has placed the purchased product in lockbox 126 before the arrival of user 102. In one example, user 102 can receive an alert notification on user device 104 informing user 102 that the product has been placed in lockbox 126 by merchant 108 and is ready to be picked up. User 102 may use any means for reaching deliver location 106, including by foot, using vehicle 122, using public transportation means, etc. In one example, providing arrival alerts to merchant 108 regarding estimated time of arrival of user 102 at delivery location 106, when user 102 is using underground public transportation means, can be based on any known or to be developed method, a non-limiting examples of which are described in U.S. application Ser. No. 16/162,902 having the effective filing date of May 3, 2018, the entire content of which is incorporated herein by reference.

The systems illustrated in FIGS. 1A and 1B are example systems for implementing the present technology. However, the present disclosure is not limited thereto.

In some examples, user 102 can retrieve a product from a vehicle operated by merchant 108. Merchant 108 could be a restaurant offering delivery, or an independent delivery service. In this instance, arrival alerts may be provided to user device 104 informing user 102 about estimated arrival time of a merchant related delivery device (e.g., a merchant vehicle) for delivering a purchased product to user 102. Moreover, a transaction code may be provided on merchant device 110 with a temporary access key for accessing a location of user 102 (e.g., a user's car, home, office, etc.) for placing the delivered product inside the location of the user.

In some examples, in the context of FIG. 1A, vehicle 122 can be an autonomous vehicle sent to pick up a product order on behalf of user 102 from delivery location 106.

In some examples and in the context of FIG. 1A, an automated system may place/initiate an order for a product or service with merchant 108 instead of user 102. Such system can be a configured home system that may be programmed to order any item or a number of specified items upon a triggering event (e.g., periodically or when any one such item needs to be replenished). Upon detecting the triggering event, such autonomous system places an order with merchant 108 or any other relevant merchant and the process of generating a transaction code with temporary access key may be implemented in the same manner as described above and as will be further described above.

Figure 2A:
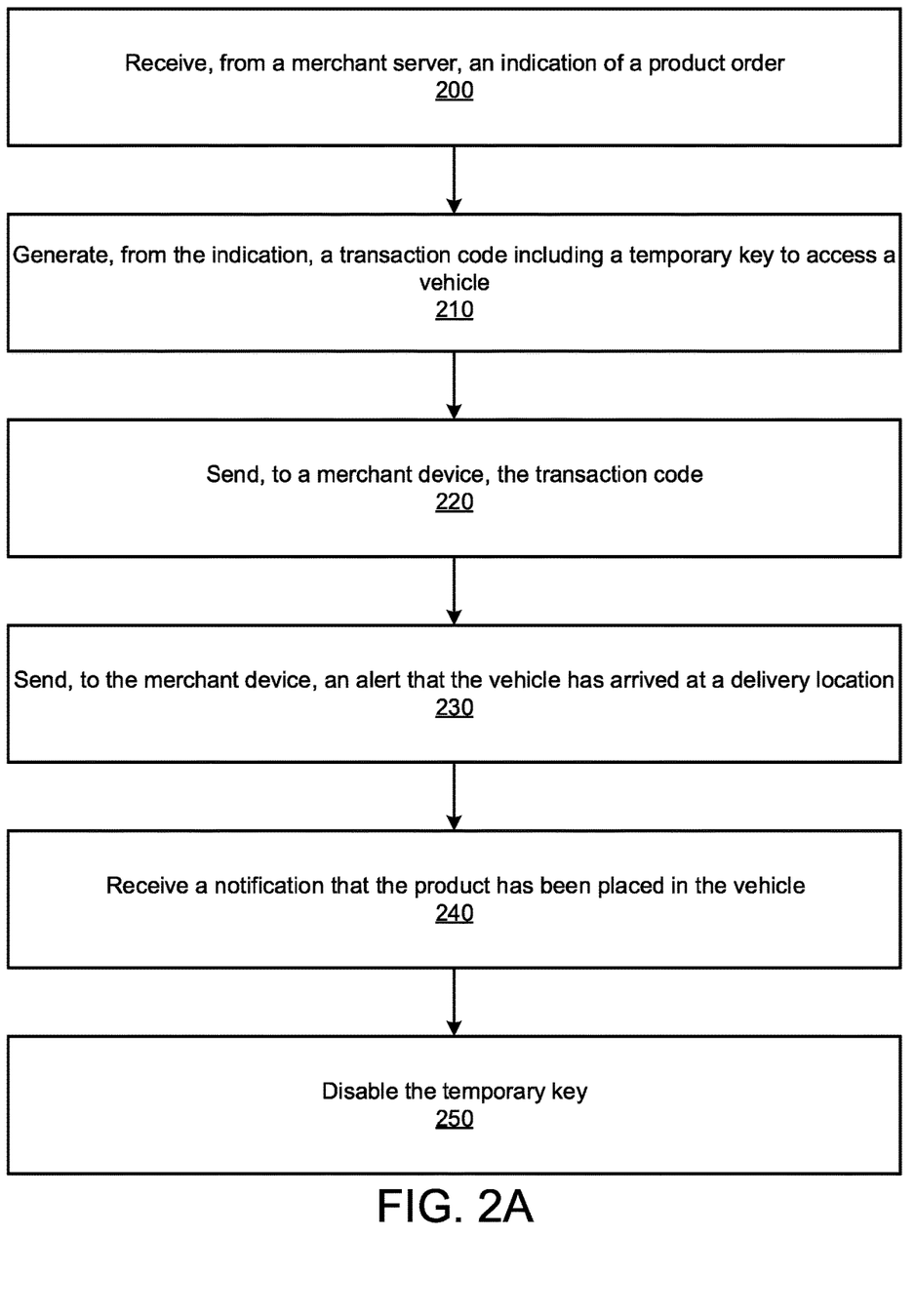
FIGS. 2A and 2B illustrate example methods in accordance with some aspects of the present disclosure.
Figure 2B:
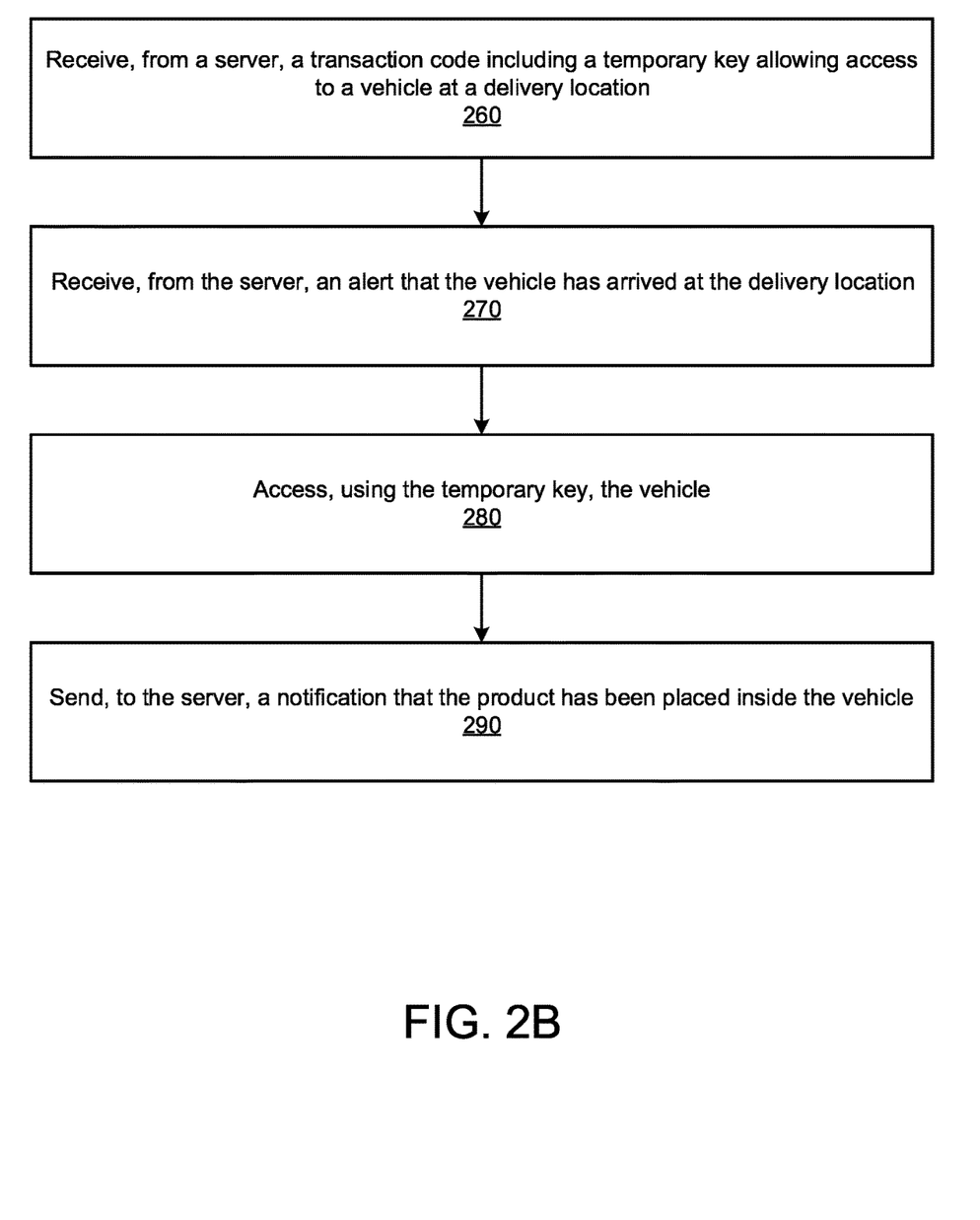

FIGS. 2A and 2B illustrate example methods in accordance with some aspects of the present disclosure. The methods illustrated in FIGS. 2A and 2B can be carried out by system 100 illustrated in FIGS. 1A and 1n particular by server 112. It is noted that server 112 may have one or more processors configured to execute computer-readable instructions stored on one or more associated memories to implement the steps/processes described below with reference to FIG. 2A.

At process 200, server 112 receives from merchant server 128 an indication that an order for a product has been placed by user 102 with merchant 108 (in person, using user device 104 and merchant device 110, or on a merchant website, as described above). The indication can include, among other information, information identifying the purchased product, merchant identifying location, product delivery location such as delivery location 106, identifying information of user 102, user device 104 and/or vehicle 122, etc.

At process 210, in response to receiving the indication, server 112 generates a transaction code for the ordered product. As noted above, the transaction code can be any type of known or to be developed computer-readable code such as a QR code, a barcode, etc. Included in the transaction code can be a temporary access key for accessing vehicle 122 or any other means of transportation (private means of transportation) used by user 102 to travel to delivery location 106 for picking up the ordered product. The temporary key can grant merchant 108 temporary access to vehicle 122. Vehicle 122 can be operated by user 102 or by another user to pick up the product from delivery location 106.

In one example, user device 104 may be configured as a vehicle access key for vehicle 122 and may have a virtual access key stored on it (e.g., in a virtual wallet on user device 104). A temporary token representing the vehicle access key may be generated by user device 104 and sent to server 112 at the time of ordering the product at process 200. Accordingly, server 112 can generate the transaction code to include the temporary token as a temporary access key, which is then sent to merchant device 110 to be used for accessing vehicle 122 to place the ordered product in. The temporary access key can be delivered to merchant device 110 at the time it is generated, or it can be delivered based on attributes like the location of vehicle 122 relative to delivery location 106, the estimated time of arrival of vehicle 122 to delivery location 106, or other factors. For example, the temporary access key can be delivered to merchant device 110 when vehicle 122 is within a threshold distance of a location of a merchant associated with merchant device 110. Such threshold may be a configurable parameter determined based on experiments and/or empirical studies. In another example, while access key may be delivered to merchant device 110 prior to arrival of vehicle 122 (e.g., when an order is placed with the merchant, when vehicle 122 initiates traveling to the location of the merchant or is within a threshold distance of the merchant, etc.), the access key may not be enabled (activated) until vehicle 122 is within a corresponding threshold distance of the merchant and/or within a threshold time of arrival at the location of the merchant, both of which can be configurable parameters determined based on experiments and/or empirical studies.

In another example, when user device 104/vehicle 122 is within a threshold proximity of delivery location 106 (with such threshold proximity being a configurable parameter determined based on experiments and/or empirical studies or being the same as thresholds used to provide arrival alerts to merchant device 110), user device 104 and/or vehicle 122 can share such a temporary token representing the vehicle access key with server 112 or directly with merchant device 110 for inclusion in the transaction code. In the case of transmitting the temporary token directly to merchant device 110, the transmission of the token and inclusion thereof in the transaction code may be completely seamless and encrypted such that merchant 108 cannot view, access and/or store the temporary token on merchant device 110. This encrypted process increases the overall system security.

In another example, the temporary token may be directly shared with merchant device 110 and/or any other mobile device accompanying merchant 108 at time of delivery of the ordered product to vehicle 122. In this instance, when merchant device 110 is within a threshold distance (e.g., 2 feet, 1 meter, etc.) of vehicle 122 (and/or user device 104), a short range communication scheme such as NFC, BLE, etc., can be used for an encrypted and direct transfer of the temporary token from user device 104/vehicle 122 to merchant device 110 for accessing vehicle 122 and placing the ordered product inside vehicle 122. The temporary token in this case can be included in the transaction code to avoid separate storage thereof on merchant device 110. In another example, the temporary token can be used directly for temporary access to vehicle 122, without inclusion of the temporary token in the transaction code on merchant device 110.

At process 220, once the transaction code has been generated, server 112 sends the transaction code to merchant device 110 using any known or to be developed communication scheme.

At process 230, server 112 sends an alert to merchant 108 via merchant device 110 indicating that vehicle 122 is arriving or has arrived at delivery location 106. As noted above, arrival alerts providing merchant with updates on the estimated arrival time of user 102 at delivery location 106 can be provided to merchant device 110 periodically or upon occurrence of certain triggering events, non-limiting examples of which are described in U.S. application Ser. No. 15/672,399 filed on Aug. 9, 2017; U.S. application Ser. No. 16/402,368 having the effective filing date of May 3, 2018; U.S. application Ser. No. 16/167,658 having the effective filing date of May 3, 2018; U.S. application Ser. No. 16/402,408 having the effective filing date of May 3, 2018; U.S. application Ser. No. 16/402,432 having the effective filing date of May 3, 2018; and U.S. application Ser. No. 16/162,902 having the effective filing date of May 3, 2018, the entire contents of which are incorporated herein by reference. This information can help merchant 108 to ensure that the ordered product is timely prepared for user 102 to pick up upon arrival at delivery location 106.

At process 240, server 112 receives a notification that the product has been placed in vehicle 122. This notification can be received from merchant device 110 after merchant 108 accesses vehicle 122 using the transaction code displayed on merchant device 110 and provides an indication (a confirmation) on merchant device 110 that the product has been placed inside vehicle 122. Alternatively, such notification/confirmation of placement of the ordered product inside vehicle 122 can be provided to server 112 by user 102 via user device 104. In another example, both user 102 and merchant 108, using, respectively one of user device 104 and merchant device 110, provide the confirmation.

At process 250, once the notification is received, server 112 disables the temporary access key to prevent unauthorized access to vehicle 122. In one example, server 112 removes the temporary access key from the transaction code or generates the transaction code such that upon receiving the notification, the temporary access key is automatically disabled.

FIG. 2B illustrates a counterpart method to the method illustrated in FIG. 2A. FIG. 2B describes the process of FIG. 2A from the perspective of merchant device 110. It is noted that merchant device 110 may have one or more processors configured to execute computer-readable instructions stored on one or more associated memories to implement the steps/processes described below with reference to FIG. 2B.

At process 260, merchant device 110 receives the transaction code from server 112. The transaction code may correspond to an order for a product placed by user 102 with merchant 108 and can be generated by server 112 as described above with reference to FIG. 2A.

At process 270, merchant device 110 receives an alert that vehicle 122 has arrived at delivery location 106. Arrival alerts may be provided to merchant device 110 by server 112 as described above with reference to FIG. 2A.

Upon arrival of vehicle 122, at process 280, merchant device 110 accesses vehicle 122 using the transaction code and the temporary access key embedded in the transaction code in order to place the ordered product inside vehicle 122. In some examples, any known or to be developed short range communication scheme including, but not limited to, near-field communication (NFC), Bluetooth and Bluetooth Low Energy (BLE), ultra-wideband (UWB), radio-frequency identification (RFID), Wi-Fi network, or cellular network technologies can be used in order to allow access to vehicle 122 using the temporary key embedded in the transaction code.

At process 290, after placing the product in vehicle 122, merchant device 110 sends a notification to server 112 that the product has been placed in vehicle 122, in response to which the temporary access key embedded in the transaction code is disabled/deleted by server 112, as described above.

Figure 3A:
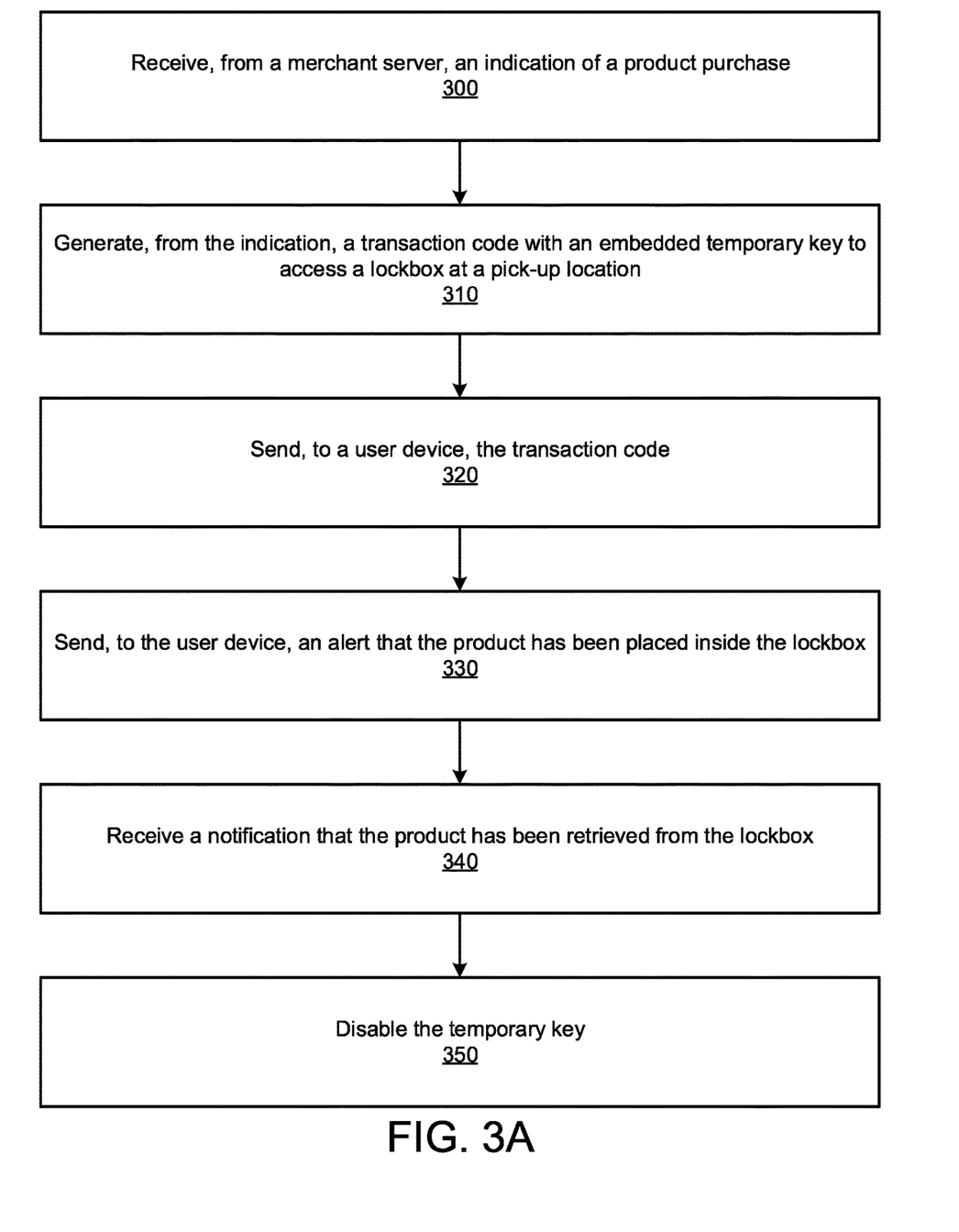
FIGS. 3A and 3B illustrate example methods in accordance with some aspects of the present disclosure.
Figure 3B:
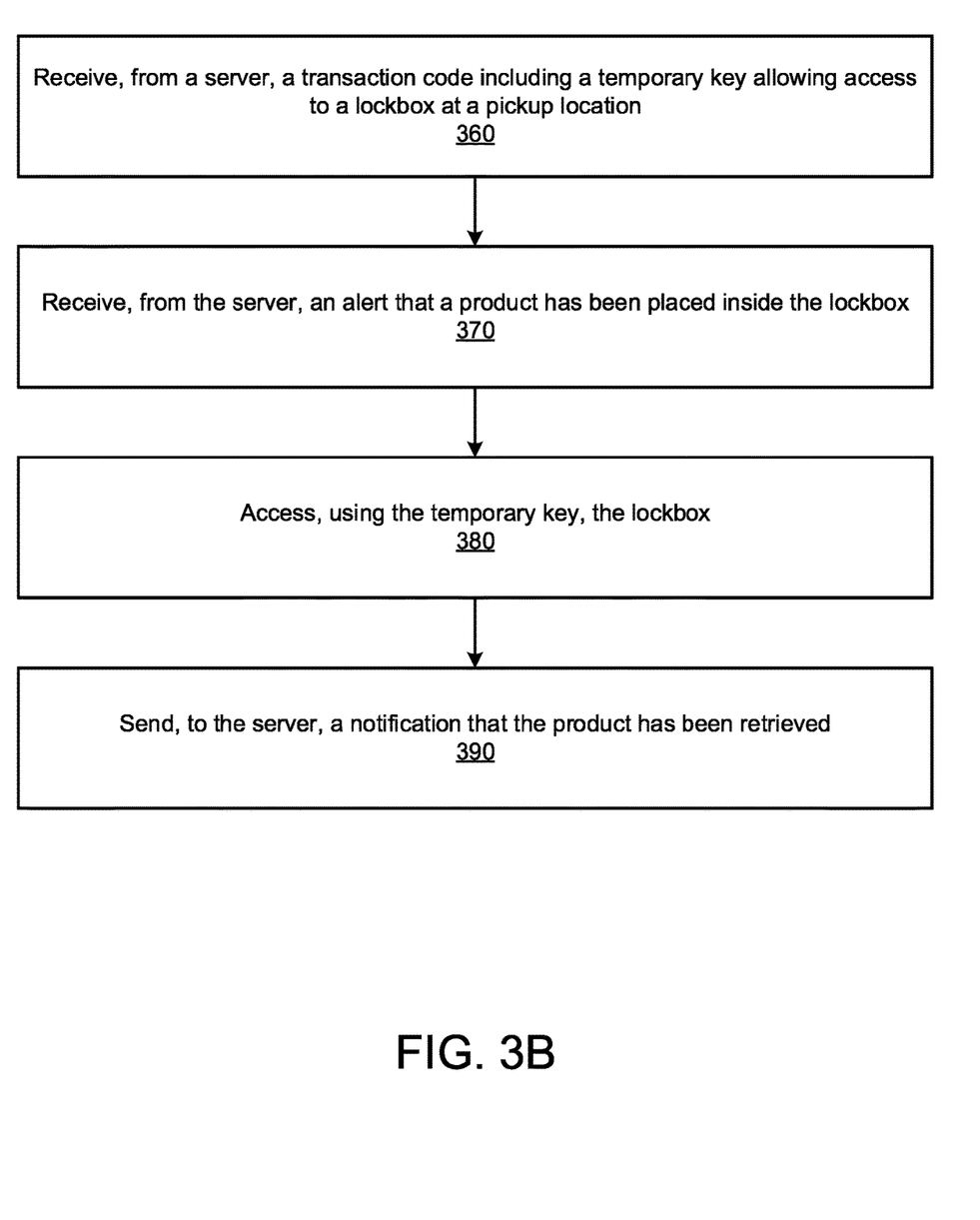

FIGS. 3A and 3B illustrate example methods in accordance with some aspects of the present disclosure. The methods illustrated in FIGS. 3A and 3B can be carried out by the system illustrated in FIGS. 1B and 1n particular by server 112. It is noted that server 112 may have one or more processors configured to execute computer-readable instructions stored on one or more associated memories to implement the steps/processes described below with reference to FIG. 3A.

At process 300, server 112 receives from merchant server 128 an indication that an order for a product has been placed by user 102 with merchant 108. Process 300 can be performed in a similar manner as process 200 in FIG. 2A described above.

At process 310, in response to receiving the indication, server 112 generates a transaction code for the ordered product. Included in the transaction code can be a temporary access key for accessing lockbox 126 used by merchant 108. Process 310 can be performed in a similar manner as process 210 in FIG. 2A described above.

In one example, merchant device 110 may be configured as a lockbox access key for lockbox 126 and may have a virtual access key stored on it (e.g., in a virtual wallet on merchant device 110). A temporary token representing the lockbox access key may be generated by merchant device 110 and sent to server 112 at the time of ordering the product at process 300. Accordingly, server 112 can generate the transaction code to include the temporary token as a temporary access key, which is then sent to user device 104 to be used for accessing lockbox 126 to retrieve the ordered product from. The temporary access key can be delivered to user device 104 at the time it is generated, or it can be delivered based on attributes like the location of user device 104 relative to lockbox 126, the estimated time of arrival of vehicle 122 to lockbox 126, or other factors. For example, the temporary access key can be delivered to user device 104 when user device 104 is within a threshold distance of lockbox 126. Such threshold may be a configurable parameter determined based on experiments and/or empirical studies. In another example, while access key may be delivered to user device 104 prior to arrival of user device 104 (e.g., when an order is placed with the merchant, when vehicle 122 or user device 104 start moving toward the location of lockbox 126 or is within a threshold distance of lockbox 126, etc.), the access key may not be enabled (activated) until user device 104 is within a corresponding threshold distance of lockbox 126 and/or within a threshold time of arrival at the location of lockbox 126, both of which can be configurable parameters determined based on experiments and/or empirical studies.

In another example, when user device 104 is within a threshold proximity of delivery location 106 (with such threshold proximity being a configurable parameter determined based on experiments and/or empirical studies or being the same as thresholds used to provide arrival alerts to merchant device 110), merchant device 110 can share such a temporary token representing the lockbox access key with server 112 or directly with user device 104 for inclusion in the transaction code. In the case of transmitting the temporary token directly to user device 104, the transmission of the token and inclusion thereof in the transaction code may be completely seamless and encrypted such that user 102 cannot view, access and/or store the temporary token on user device 104. This encrypted process increases the overall system security.

In another example, the temporary token may be directly shared with user device 104 and/or any other mobile device accompanying merchant 108 at time of delivery of the ordered product via lockbox 126. In this instance, when user device 104 is within a threshold distance (e.g., 2 feet, 1 meter, etc.) of lockbox 126 (and/or user device 104), a short range communication scheme such as NFC, BLE, etc., can be used for an encrypted and direct transfer of the temporary token from merchant device 110 or lockbox 126 to user device 104 for accessing lockbox 126 and retrieving the ordered product. The temporary token in this case can be included in the transaction code to avoid separate storage thereof on user device 104. In another example, the temporary token can be used directly for temporary access to lockbox 126, without inclusion of the temporary token in the transaction code on user device 104.

At process 320, once the transaction code has been generated, server 112 sends the transaction code to user 102 via user device 104. Server 112 may send the transaction code to user device 104 in a similar manner to sending the transaction code to merchant device 110 as described above with reference to process 220 of FIG. 2A.

At process 330, server 112 sends an alert to user 102 via user device 104 indicating that the product has been placed in lockbox 126 at delivery location 106. In some examples, before the alert, merchant 108 receives location information of user 102 (arrival alerts) via user device 104 and merchant device 110, and in some examples also receives an estimated time of arrival. This information can help prepare merchant 108 to make a speedy transfer of the product. Server 112 may send the alert to user device 104 in a similar manner to sending the alert to merchant device 110 as described above with reference to process 230 of FIG. 2A.

At process 340, server 112 receives a notification that the product has been retrieved from lockbox 126. This notification can be sent by merchant 108 via merchant device 110, user 102 via user device 104, or both for confirmation purposes. Server 112 may receive the notification in a similar manner to receiving the notification as described above with reference to process 240 of FIG. 2A.

At process 350, once the notification is received, server 112 disables the temporary key to prevent unauthorized access to lockbox 126. Server 112 may disable the temporary key in a similar manner to disabling the temporary key as described above with reference to process 250 of FIG. 2A.

FIG. 3B illustrates a counterpart method to the method illustrated in FIG. 3A. FIG. 3B describes the process of FIG. 3A from the perspective of user device 104. It is noted that user device 104 may have one or more processors configured to execute computer-readable instructions stored on one or more associated memories to implement the steps/processes described below with reference to FIG. 3B.

At process 360, user device 104 receives the transaction code from server 112. User device 104 may receive the transaction code in a similar manner to receiving the transaction code as described above with reference to process 260 of FIG. 2B.

At process 370, user device 104 receives an alert that the product has been placed in lockbox 126 at delivery location 106. User device 104 may receive the alert in a similar manner to receiving the alert as described above with reference to process 270 of FIG. 2B.

Upon arrival of user 102, at process 380, user device 104 accesses lockbox 126 using the transaction code and the temporary access key embedded in the transaction code in order to retrieve the ordered product from lockbox 126. In some examples, any known or to be developed short range communication scheme including, but not limited to, near-field communication (NFC), Bluetooth and Bluetooth Low Energy (BLE), ultra-wideband (UWB), radio-frequency identification (RFID), Wi-Fi network, or cellular network technologies can be used in order to allow access to lockbox 126 using the temporary key embedded in the transaction code. User device 104 may access lockbox 126 in a similar manner to accessing vehicle 122 as described above with reference to process 280 of FIG. 2B.

At process 390, after retrieving the product from lockbox 126, user device 104 sends a notification to server 112 that the product has been retrieved, in response to which the temporary access key embedded in the transaction code is disabled/deleted by server 112, as described above. User device 104 may send the notification in a similar manner to sending the notification as described above with reference to process 290 of FIG. 2B.

Figure 4:
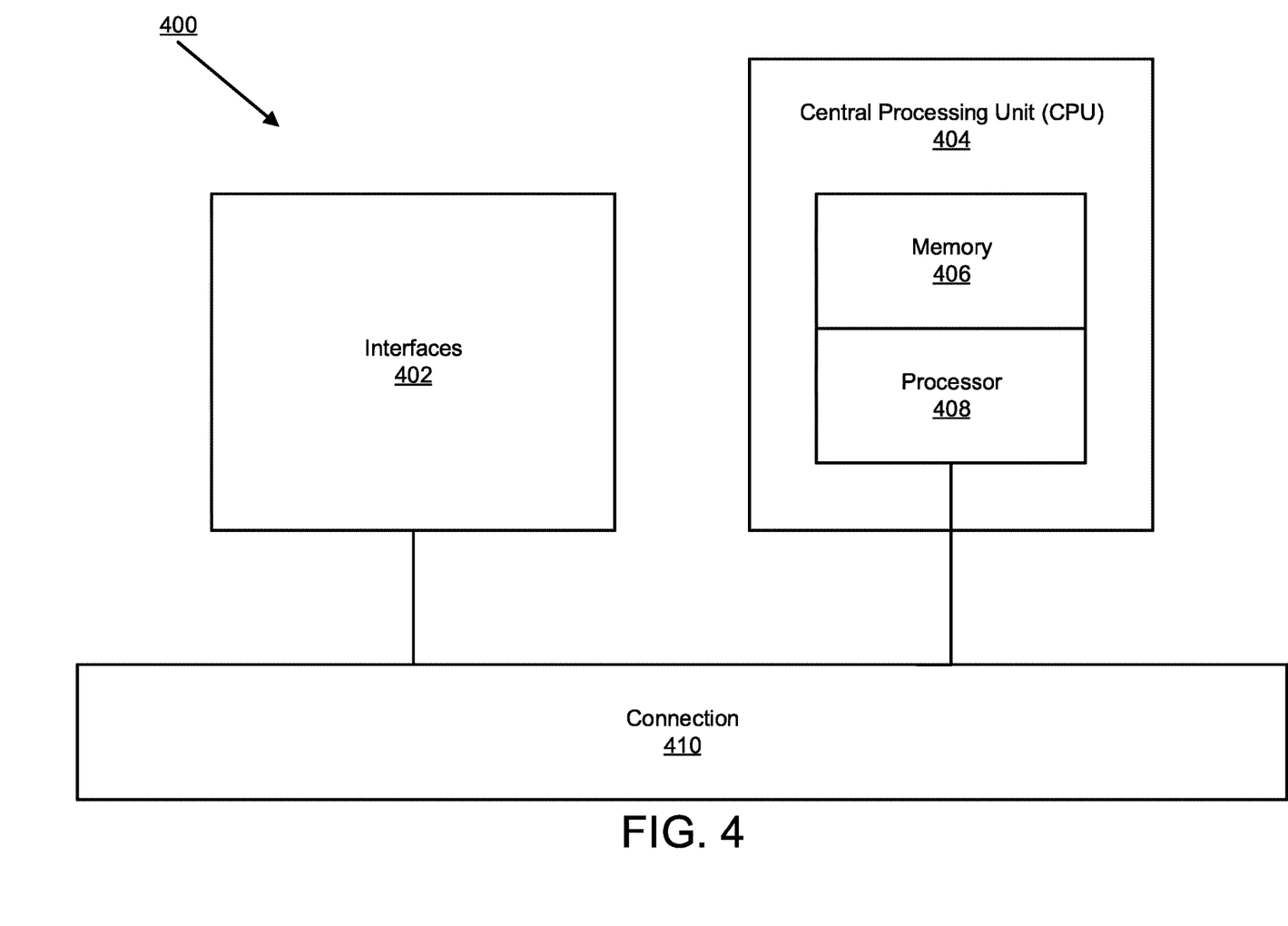
FIG. 4 illustrates an example network device, in accordance with some aspects of the present technology.

FIG. 4 illustrates an example network device, in accordance with some examples of the present technology. In some examples, user device 104, merchant device 110, or other devices discussed in the example systems may be implemented according to the configuration of the network device 400. The network device 400 includes a central processing unit (CPU) 404, interfaces 402, and a connection 410 (e.g., a PCI bus). When acting under the control of appropriate software or firmware, the CPU 404 is responsible for executing packet management, error detection, and/or routing functions. The CPU 404 preferably accomplishes all these functions under the control of software including an operating system and any appropriate applications software. The CPU 404 may include one or more processors 408, such as a processor from the INTEL X86 family of microprocessors. In some cases, processor 408 can be specially designed hardware for controlling the operations of the network device 400. In some cases, a memory 406 (e.g., non-volatile RAM, ROM, etc.) also forms part of the CPU 404. However, there are many different ways in which memory could be coupled to the system.

Figure 5:
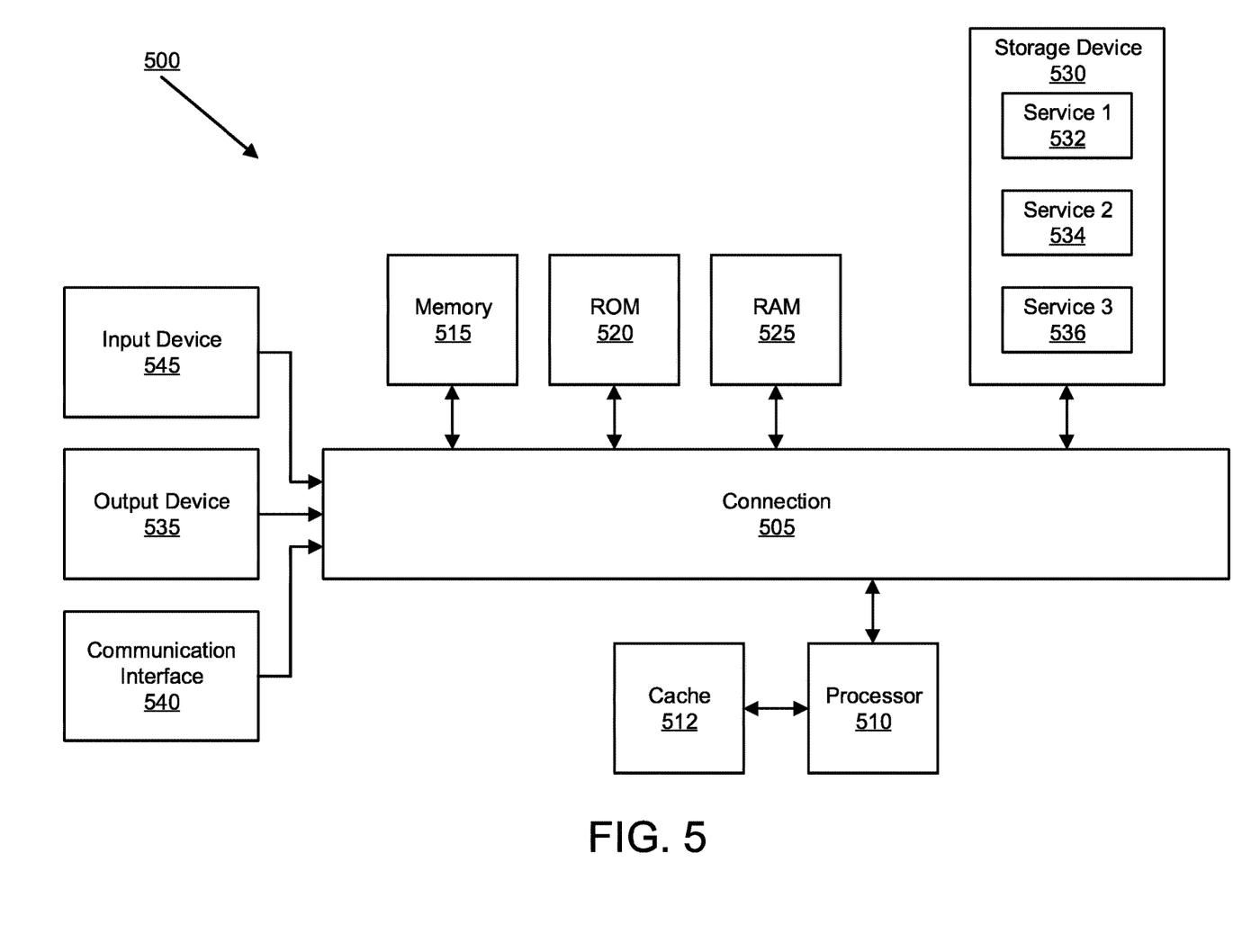
FIG. 5 illustrates an example computing device architecture, in accordance with some aspects of the present technology.

The interfaces 402 are typically provided as modular interface cards (sometimes referred to as "line cards"). Generally, they control the sending and receiving of data packets over the network and sometimes support other peripherals used with the computing device architecture 500. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the CPU 404 to efficiently perform routing computations, network diagnostics, security functions, etc.

Although the system shown in FIG. 4 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 400.

Regardless of the network device's configuration, it may employ one or more memories or memory modules (including memory 406) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. The memory 406 could also hold various software containers and virtualized execution environments and data.

The network device 400 can also include an application-specific integrated circuit (ASIC), which can be configured to perform routing and/or switching operations. The ASIC can communicate with other components in the network device 400 via the connection 410, to exchange data and signals and coordinate various types of operations by the network device 400, such as routing, switching, and/or data storage operations, for example.

FIG. 5 illustrates an example computing device architecture, in accordance with some examples of the present technology. The components of the computing device architecture 500 are shown in electrical communication with each other using a connection 505, such as a bus. The example computing device architecture 500 includes a processing unit (CPU or processor) 510 and a computing device connection 505 that couples various computing device components including the computing device memory 515, such as read only memory (ROM) 520 and random access memory (RAM) 525, to the processor 510.

The computing device architecture 500 can include a cache of high-speed memory connected directly with, in close proximity to, or integrated as part of the processor 510. The computing device architecture 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other computing device memory 515 may be available for use as well. The memory 515 can include multiple different types of memory with different performance characteristics. The processor 510 can include any general purpose processor and a hardware or software service, such as service 1 532, service 2 534, and service 3 536 stored in storage device 530, configured to control the processor 510 as well as a special-purpose processor where software instructions are incorporated into the processor design. The processor 510 may be a self-contained system, containing multiple cores or processors, a bus, memory controller, cache, etc. A multi-core processor may be symmetric or asymmetric.

To enable user interaction with the computing device architecture 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art, such as a display, projector, television, speaker device, etc. In some instances, multimodal computing devices can enable a user to provide multiple types of input to communicate with the computing device architecture 500. The communications interface 540 can generally govern and manage the user input and computing device output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof. The storage device 530 can include services 532, 534, 536 for controlling the processor 510. Other hardware or software modules are contemplated. The storage device 530 can be connected to the computing device connection 505. In one aspect, a hardware module that performs a particular function can include the software component stored in a computer-readable medium in connection with the necessary hardware components, such as the processor 510, connection 505, output device 535, and so forth, to carry out the function.

For clarity of explanation, in some instances the present technology may be presented as including individual functional blocks including functional blocks comprising devices, device components, steps or routines in a method embodied in software, or combinations of hardware and software.

In some examples the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

The invention claimed is:

1. A method comprising:
generating, by a tracking and delivery system server and for a transaction, a transaction code, wherein the transaction code includes information identifying the transaction and a temporary key allowing access to a vehicle at a delivery location, wherein the information identifying the transaction includes a transaction identifier, a user identifier corresponding to a user, a merchant identifier corresponding to a merchant, and a product identifier corresponding to the product;
sending, by the tracking and delivery system server and to a merchant device, the transaction code;
sending, by the tracking and delivery system server and to the merchant device, an alert that the vehicle has arrived at the delivery location, wherein the temporary key is used to access the vehicle for placing a product inside the vehicle;
receiving, at the tracking and delivery system server and from the merchant device, a notification that the product has been placed inside the vehicle; and
deleting, by the tracking and delivery system server, the temporary key upon receiving the notification.

2. The method of claim 1, further comprising:
receiving the temporary key from at least one of the vehicle or a mobile device of a user associated with the vehicle.

3. The method of claim 2, wherein the temporary key is received at a time of receiving an indication of the transaction.

4. The method of claim 2, wherein the temporary key is received when the vehicle is within a threshold distance of the delivery location.

5. The method of claim 1, wherein the transaction code is one of a Quick Response (QR) code and a barcode.

6. The method of claim 1, further comprising:
upon the generation of the transaction code, tracking movement of the vehicle; and
sending updates to the merchant device regarding an estimated arrival time of the vehicle to the delivery location, a last one of the updates being the alert that the vehicle has arrived at the delivery location.

7. One or more non-transitory computer-readable storage media comprising computer-readable instructions stored thereon which, when executed by one or more processors of a tracking and delivery system server, cause the tracking and the delivery system server to:
generate, for a transaction, a transaction code, wherein the transaction code includes information identifying the transaction and a temporary key allowing access to a vehicle at a delivery location, wherein the information identifying the transaction includes a transaction identifier, a user identifier corresponding to a user, a merchant identifier corresponding to a merchant, and a product identifier corresponding to the product;

send, to a merchant device, the transaction code;

send, to the merchant device, an alert that the vehicle has arrived at the delivery location, wherein the temporary key is used to access the vehicle for placing a product inside the vehicle;

receive, from the merchant device, a notification that the product has been placed inside the vehicle; and delete the temporary key upon receiving the notification.

8. The non-transitory computer-readable storage media of claim 7, wherein the execution of the computer-readable instructions by the one or more processors cause the one or more processors to:

receive the temporary key from at least one of the vehicle or a mobile device of a user associated with the vehicle.

9. The non-transitory computer-readable storage media of claim 8, wherein the temporary key is received at a time of receiving an indication of the transaction.

10. The non-transitory computer-readable storage media of claim 8, wherein the temporary key is received when the vehicle is within a threshold distance of the delivery location.

11. The non-transitory computer-readable storage media of claim 7, wherein the transaction code is one of a Quick Response (QR) code and a barcode.

12. The non-transitory computer-readable storage media of claim 7, wherein the execution of the computer-readable instructions by the one or more processors cause the one or more processors to:

upon the generation of the transaction code, track movement of the vehicle; and send updates to the merchant device regarding an estimated arrival time of the vehicle to the delivery location, a last one of the updates being the alert that the vehicle has arrived at the delivery location.

13. A tracking and delivery system server comprising:

one or more memories including computer-readable instructions stored therein; and one or more processors configured to execute the computer-readable instructions to:

generate, by the tracking and delivery system server and for a transaction, a transaction code, wherein the transaction code includes information identifying the transaction and a temporary key allowing access to a vehicle at a delivery location, wherein the information identifying the transaction includes a transaction identifier, a user identifier corresponding to a user, a merchant identifier corresponding to a merchant, and a product identifier corresponding to the product;

send, by the tracking and delivery system server and to a merchant device, the transaction code;

send, by the tracking and delivery system server and to the merchant device, an alert that the vehicle has arrived at the delivery location, wherein the temporary key is used to access the vehicle for placing a product inside the vehicle;

receive, at the tracking and delivery system server and from a notification that the product has been placed inside the vehicle; and delete, by the tracking and delivery system server, the temporary key upon receiving the notification.

14. The tracking and delivery system server of claim 13, wherein the one or more processors are configured to execute the computer-readable instructions to:

receive the temporary key from at least one of the vehicle or a mobile device of a user associated with the vehicle.

15. The tracking and delivery system server of claim 14, wherein the temporary key is received at a time of receiving an indication of the transaction.

16. The tracking and delivery system server of claim 14, wherein the temporary key is received when the vehicle is within a threshold distance of the delivery location.

17. The tracking and delivery system server of claim 13, wherein the transaction code is one of a Quick Response (QR) code and a barcode.

18. The tracking and delivery system server of claim 13, wherein the one or more processors are configured to execute the computer-readable instructions to:

upon the generation of the transaction code, track movement of the vehicle; and send updates to the merchant device regarding an estimated arrival time of the vehicle to the delivery location, a last one of the updates being the alert that the vehicle has arrived at the delivery location.

* * * * *